United States Patent [19]

Bauer

[11] 3,850,258

[45] Nov. 26, 1974

[54] CONTROL LEVER FRICTION CLUTCH
[75] Inventor: James J. Bauer, Lisbon, N. Dak.
[73] Assignee: Clark Equipment Company, Buchanan, Mich.
[22] Filed: Apr. 20, 1973
[21] Appl. No.: 353,177

[52] U.S. Cl............. 180/6.48, 74/471 R, 74/480 R
[51] Int. Cl............................................ B62d 11/04
[58] Field of Search ........ 180/6, 48; 74/480 R, 479, 74/471 R

[56] References Cited
UNITED STATES PATENTS
3,605,519    9/1971   Heggen.......................... 180/6.48 X
FOREIGN PATENTS OR APPLICATIONS
940,561    10/1963   Great Britain .................... 74/480 R Primary Examiner—David Schonberg
Assistant Examiner—John A. Pekar
Attorney, Agent, or Firm—Jack E. Toliver

[57] ABSTRACT

A skid-steered vehicle driven by right and left transmissions having separate control levers, one for each transmission. One lever is hinged at its base. The other lever is coupled to the hinged lever by a friction clutch. The clutch may be actuated in any position of the levers. When the clutch is engaged both levers move in unison controlling both transmissions from the single lever freeing the operator's other hand for other purposes.

4 Claims, 5 Drawing Figures

3,850,258

CONTROL LEVER FRICTION CLUTCH

BACKGROUND OF THE INVENTION

1. Field of the Invention

The invention pertains to the art of vehicle controls and more specifically to controls for skid-steered vehicles having separate hydrostatic transmissions. A four-wheeled, skid-steered vehicle in the form of an end loader of the type to which the present invention pertains is disclosed, for example, in U.S. Pat. No. 3,635,365 entitled "Tractor Vehicle with Hydrostatic Drive Means" issued Jan. 18, 1972, to the assignee of the present invention; James J. Bauer, the inventor.

2. Description of the Prior Art

Skid-steered loader vehicles of the type disclosed in the aforementioned patent will have right and left hydrostatic transmissions independently controllable by a pair of control levers, one for each transmission, movable forward or back by the operator to vary the power output of the transmission in either a forward or reverse direction.

In certain cases it is desirable to have one control lever operate both transmissions. For example, the operator may wish simply to go forward without making a turning movement. This would be accomplished by pushing both levers forward an equal amount. Obviously, it is a convenience in such a case to be able to release one hand and control both transmissions with the other lever. A mechanism for accomplishing this is disclosed in U.S. Pat. No. 3,605,519 entitled "Control for Dual Hydrostatic Drive" issued Sept. 20, 1971 to the assignee of the present invention; John P. Heggen, the inventor.

In this device there is a pair of plates, one connected to the control lever on the right side and the other to the lever on the left side. A pair of converging slots in each plate are set opposite each other to receive a pair of rods extending between the plates. Tension springs between the rods yieldably hold them toward the bottom of the slots. The levers are constrained to move together when either lever is moved and unless a force is applied sufficient to override the tension springs, the effect is as though there was one lever controlling both transmissions.

However, the operator must maintain both hands on the control levers when moving them independently to override the tension springs such as required in making a turn. In making repeated short skid turns or long, continuous, turning movements, the duration of the overriding force required may result in tiring the operator or a loss of freedom of hand movement.

It is therefore a general objective of this invention to provide a mechanism which may be selectively actuated by the operator in any position of the levers to cause both levers to move in unison or be held in whatever relative lever position is desired.

SUMMARY OF THE INVENTION

In accordance with the preferred embodiment of the invention first and second levers independently control right and left transmissions, one on each side of the vehicle. The first lever is operatively connected to the right transmission by a control shaft, the rotation of which varies the output of the transmission to the wheels on the right side of the vehicle in either a forward or reverse direction. The second lever is operatively connected to the left transmission and similarly operates through a second control shaft to independently vary the output of the left transmission to the wheels on the left side of the vehicle. A clutch associated with both control shafts may be actuated such that the shafts and levers are frictionally coupled for controlling both transmissions.

More particularly the first control shaft carries the first lever on one end and the second shaft, which is concentric with the first, carries the second lever on the opposite end. A hinge connects the second lever at its base such that it may be pivoted toward the operator in any position. A clutch element moving with the hinged lever is brought into clutching engagement with a clutch element moveable with the other lever.

In the preferred embodiment the clutch includes a friction material that is engaged between the clutch elements creating a frictional coupling. The coupling force is proportional to the force exerted by the operator. The control thus may be held in any given position or moved, one lever relative to the other, for complete freedom of control function.

DESCRIPTION OF A PREFERRED EMBODIMENT

Figure 1:
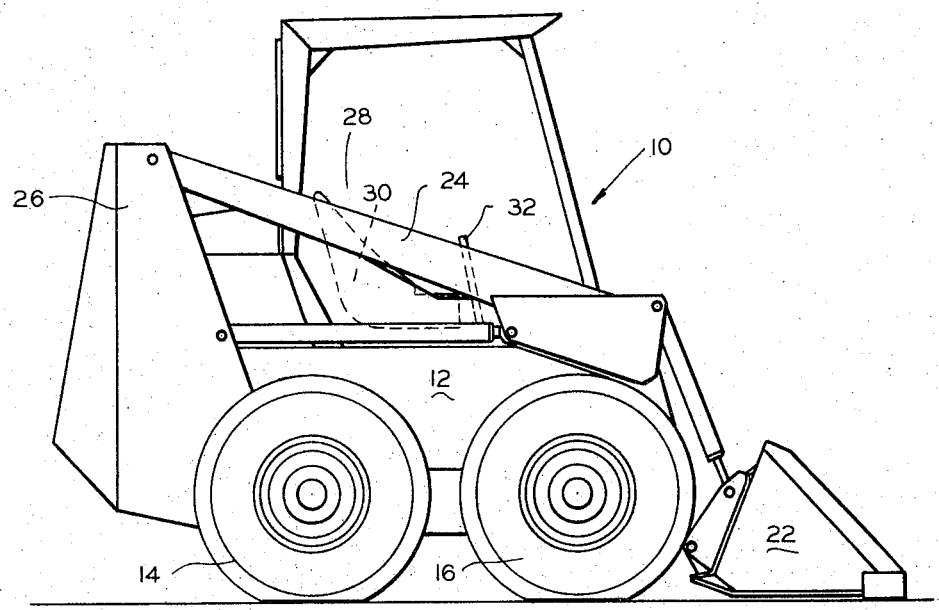
FIG. 1 shows a skid-steered, four-wheeled, front end loader having a control according to the present invention.

The reference numeral 10 in FIG. 1 denotes a skid-steered, compact, four-wheeled, front end loader having a body 12 supported by drive wheels 14, 16 on each side. The loader 10 includes a bucket 22 connected to a pair of boom arms 24 which are in turn pivotally connected to a pair of upright stanchions 26 located adjacent the rear of the body 12. Located on body 12 is an operator's station 28 which includes a seat 30 and a pair of control levers 32, one on each side of the operator's seat 30.

Figure 2:
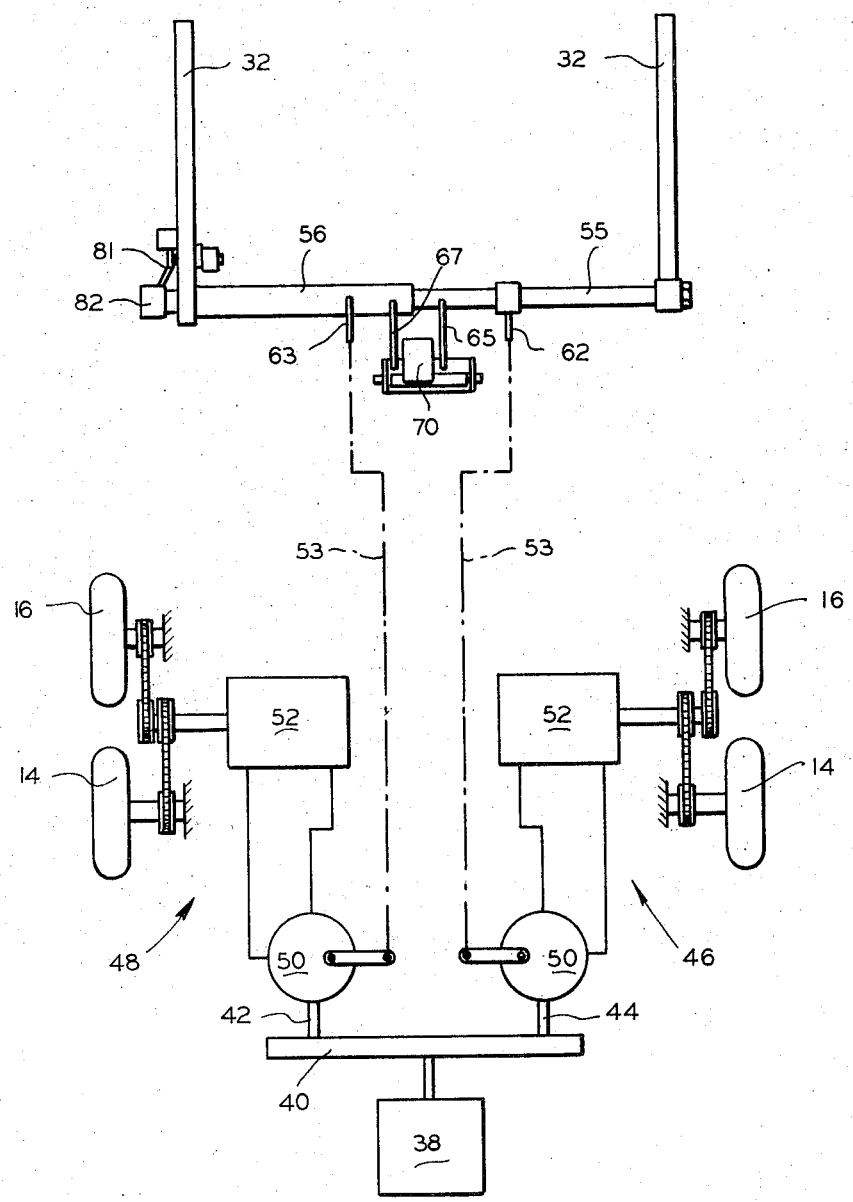
FIG. 2 is a schematic diagram of the power train and controls for the loader shown in FIG. 1.

Referring now to FIG. 2, the drive train for wheels 14, 16 includes a prime mover 38, such as an internal combustion engine, which has its crank shaft connected to a transfer case 40 providing two separate power outputs 42, 44. The drive train also includes separate hydrostatic transmissions 46, 48, one propelling the wheels on the right side of the loader and the other propelling those on the left side. A drive train similar to the aforementioned drive is disclosed in U.S. Pat. No. 3,635,365, mentioned above, and a more detailed discussion of the hydrostatic transmissions will be found in that specification; specific reference being made to column 4, line 40 et seq. of the description and FIG. 8 of the patent drawings. Briefly, both the right and left hydrostatic transmissions 46, 48 will include a variable displacement pump 50. Each pump is connected to an output 42, 44 of the transfer case 40 and is operatively associated with an hydrostatic motor 52. Both the pumps and motors have a series of revolving pistons which engage either fixed or variable swash plates and, at least in the case of the pumps, may be angled, either forward or backward, with respect to a zero displacement or neutral position. The displacement of each piston per revolution is adjusted by varying the plane of the swash plate from its zero displacement position in either direction producing forward or reverse rotation of the motors 52. The motors 52 drive all four wheels through a chain and gear reduction drive housed in the loader body 12. The control levers 32 may be operated independently to control the swash plates through a mechanical or servo control system. Such a system is depicted by the dot-dash lines 53. The description in U.S. Pat. No. 3,635,365 mentioned above may be referred to for a more detailed description of the drive and drive components and is incorporated herein by reference.

Figure 5:
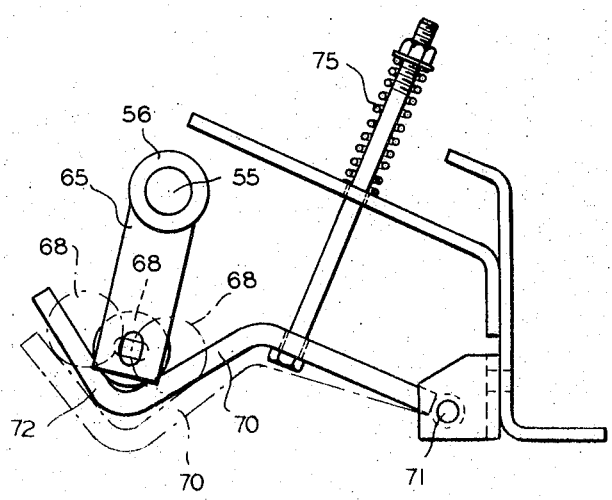
FIG. 5 is a view taken approximately along line 5—5 of FIG. 3 showing a portion of the control mechanism in FIG. 3.
Figure 3:
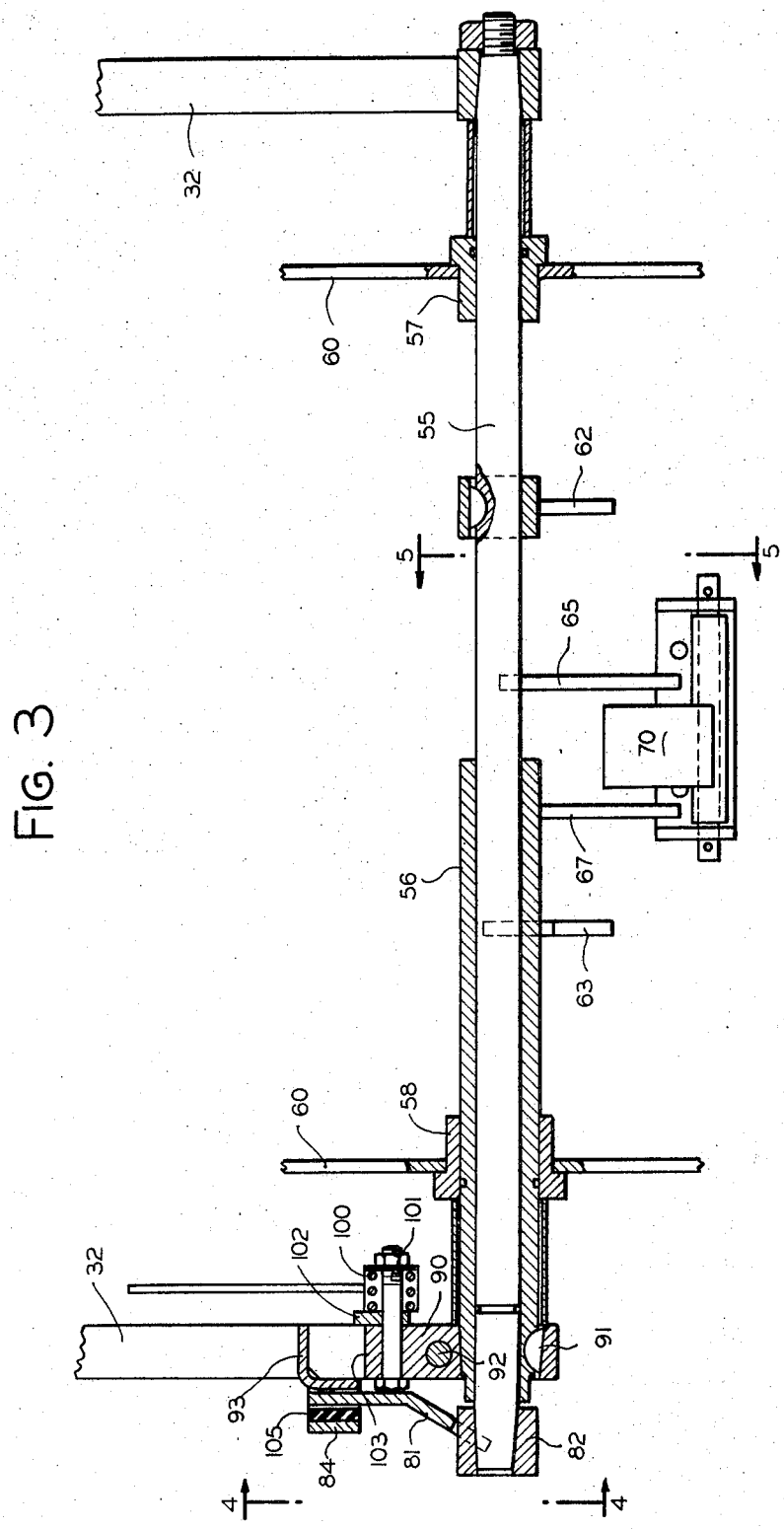
FIG. 3 shows the control mechanism.

In the preferred embodiment of the invention (FIG. 3) the first control lever 32 is mounted on a first shaft 55. The second control lever 32 is mounted on a second shaft 56 through which the shaft 55 extends. The shaft 55 rotates in bushing 57 while both shafts rotate in bushings 58. The bushings 57, 58 are carried by structure 60 of the loader body. Each shaft 55, 56 carries a link 62, 63 which is connected, as depicted in FIG. 2, to the control system 53 for operating the swash plates of the pumps 50. Also carried on each shaft 55, 56 is a cam follower 65, 67, each having a roller 68 (FIG. 5) that rolls on a cam plate 70. The cam plate 70 is pivotally mounted at 71 parallel to the rotational axis of the shafts 55, 56. The cam plate 70 has a curved portion 72 diverging away from the axis of shafts 55, 56. The cam plate tends to return the cam rollers 68, and thus the swash plates of the pumps 50, always to the zero displacement position under the influence of a spring 75. In the zero displacement position, the control levers 32 are upright or centered in a neutral position. The mechanism for returning the levers to the centered position is similar to one described in U.S. Pat. No. 3,605,519 mentioned before. The operation of the centering mechanism is such that regardless of the direction that the rollers 68 move along the cam plate 70, the force of spring 75 will tend to return them to the apex 72 of the cam plate and so tend to bring the swash plates back to the zero displacement position.

Figure 4:
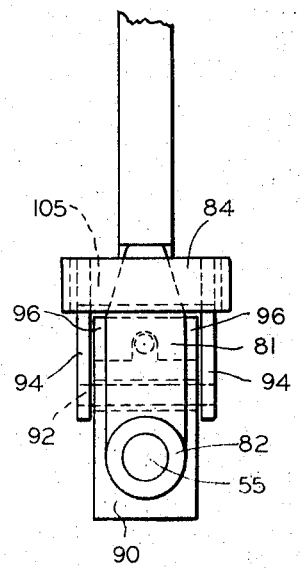
FIG. 4 is a left end view of the mechanism shown in FIG. 2 taken along line 4—4 of FIG. 3.

In accordance with the preferred embodiment of the invention, there is a first clutch element in the form of a rigid bar 81 (FIG. 3) secured by a collar 82 on the end of the first shaft 55 which projects through the second shaft 56. A second clutch element in the form of a yoke 84 is connected to the second control lever 32. The second control lever 32 is hinged at its lower end. A fixed hinge part 90 is secured on the shaft 56 by a Woodruff key 91. A movable hinge part 93, on which the yoke 84 is carried, attaches to the second control lever 32. Hinge pin openings in the legs 94, 96 (FIG. 4) of the movable and fixed hinge parts are aligned above the axis of shafts 55, 56 to receive a hinge pin 92. A spring 100 (FIG. 3) is held by a bolt 101 secured to the fixed hinge part 90. A stop 102 is secured to the movable hinge part 93 and rides on the bolt 101 to compress the spring 100 when the second control lever 32 is hinged or swung toward the operator and when released, abuts the fixed hinge part 90 to stop the lever in an upright position. A friction material 105 is attached to the back of the yoke 84. The upper end of the bar 81 projects into the space surrounded by the yoke 84, and in the upright position of the second control lever 32, is slightly spaced from the friction material 105. Thus with only a small hinging movement of the lever, the first and second clutch elements 81, 84 are engaged generating a frictional force causing both shafts 55, 56 to move in unison with the second control lever 32.

In operation, the operator may desire to drive the wheels 14, 16 on one side of the loader at the same speed and in the same direction as the wheels on the other side. To do so, it is merely necessary to push or pull both levers 32 simultaneously depending on whether forward or reverse drive is desired. Assuming then that the travel speed and direction have been reached suited to the operating conditions for the work being performed, the operator may, if he chooses at this point, pull the second control lever 32 toward him hinging it about the pin 92 so as to engage the first and second clutch elements 81, 84. The frictional drag or coupling will be sufficient to hold the desired relationship of the control shafts 55, 56 so long as the clutch elements are engaged with a force great enough to overcome the back pressure from the drive. When it is desired to return to independent operation, the second control lever is released allowing the spring 100 to return it to the upright, clutch disengaged position.

While only a single embodiment of my invention has been described in detail, it will be understood that each detailed description is intended to be illustrative only and that various modifications and changes may be made to my invention without departing from the spirit and scope of it. Therefore, the limits of my invention should be determined from the attached claims.

I claim:

1. The combination comprising first and second separate variable output drive means, a first rotatable shaft operatively connected to said first drive means so that rotation of said first shaft varies the output of said first drive means, a second rotatable shaft operatively connected to said second drive means so that rotation of said second shaft varies the output of said second drive means, a first clutch element connected to said first rotatable shaft, a second clutch element connected to the second rotatable shaft, spring means biasing said first and second clutch elements apart so that said first and second rotatable shafts can be rotated independently of each other, centering means interconnecting said first and second rotatable shafts tending to return said shafts to a centered position coinciding with a neutral drive position with respect to both first and second variable output drive means, the ends of said shafts being in juxtaposed relationship on one side, a control lever secured on the opposite side to the first shaft, a second control lever, a hinge securing the second control lever on the second shaft on the opposite side having a hinge axis extending transversely of the axis of rotation of said first and second shafts, said second clutch element being connected to the second control lever above the hinge axis, said first clutch element being connected to the first shaft and extending opposite the second clutch element such that said clutch elements may be engaged by pivoting said second control lever about the hinge axis.

2. The combination according to claim 1 wherein said spring means acts on the second control lever so as to normally bias it to an upright, clutch disengaged position and a stop associated with the hinge positioned so as to block the lever from pivoting beyond the upright position.

3. The combination according to claim 2 wherein said second clutch element comprises a rigid yoke member having a back spaced from said first clutch element and a friction material secured on said back of the yoke member becoming engageable with the first clutch element when pivoting the second control lever.

4. A self-propelled, skid-steered vehicle propelled and steered by driving ground-engaging wheels on one side at a different speed or direction that ground-engaging wheels on the opposite side so as to effect skid turns having separate right and left hydrostatic drives propelling and maneuvering the vehicle in forward and reverse directions, each said hydrostatic drive comprising a variable displacement pump having a swash plate normally biased to a zero displacement position and which is continuously variable from said zero displacement position to maximum displacement positions in either direction, right and left control levers, one on each side of the driver's compartment associated with the right and left hydrostatic drives, first and second rotatable shafts connected to the right and left control levers and operatively connected to the swash plates of the variable displacement pumps of the right and left hydrostatic drives, the improvement comprising a first clutch element connected to the first shaft, a second clutch element connected to the second shaft, the ends of the shafts being positioned in juxtaposed relation and the first and second clutch elements being closely spaced on said respective shaft ends, hinged means having a pivot axis extending transversely to the rotational axis of said shafts connecting one clutch element and one control lever for pivoting the clutch element so as to bring said clutch elements into engagement, spring means biasing the hinge means in the opposite direction so as to maintain said first and second clutch elements normally disengaged, centering means interconnecting said first and second rotatable shafts including a first cam follower rotatable with said first shaft, a second cam follower rotatable with the second shaft, a cam plate pivotally mounted adjacent said first and second shafts having a portion of maximum divergence generally opposite said shafts, spring means biasing said cam plate toward said shafts and said first and second cam follower being engageable with said cam plate and normally urged toward the point of maximum divergence by said spring means tending thereby to maintain said shafts in a centered position coinciding with the zero displacement position of said swash plates.

* * * * *